(12) United States Patent
Choi et al.

(10) Patent No.: US 8,374,907 B1
(45) Date of Patent: Feb. 12, 2013

(54) E-COMMERCE PRICE INDEX

(75) Inventors: Hyunyoung Choi, Mountain View, CA (US); Robert On, Cupertino, CA (US); Hal R. Varian, Danville, CA (US)

(73) Assignee: Google Inc., Mountain View, CA (US)

( * ) Notice: Subject to any disclaimer, the term of this patent is extended or adjusted under 35 U.S.C. 154(b) by 266 days.

(21) Appl. No.: 12/906,118

(22) Filed: Oct. 17, 2010

(51) Int. Cl.
*G06Q 10/00* (2012.01)
*G06Q 30/00* (2012.01)
*G06F 17/00* (2006.01)
*G06G 7/00* (2006.01)

(52) U.S. Cl. ....... 705/7.35; 705/1.1; 705/26.1; 705/300; 705/348; 705/400

(58) Field of Classification Search .......................... None
See application file for complete search history.

(56) References Cited

U.S. PATENT DOCUMENTS

| | | | |
|---|---|---|---|
| 5,581,678 A | 12/1996 | Kahn | |
| 6,978,257 B1 | 12/2005 | Halbout et al. | |
| 7,330,839 B2 | 2/2008 | Srinivasan et al. | |
| 7,373,317 B1 | 5/2008 | Kopelman et al. | |
| 7,406,436 B1 | 7/2008 | Reisman | |
| 7,492,971 B2 | 2/2009 | Sakuma et al. | |
| 7,660,738 B1 | 2/2010 | Siegel et al. | |
| 7,970,666 B1 | 6/2011 | Handel | |
| 2002/0087389 A1 | 7/2002 | Sklarz et al. | |
| 2003/0158784 A1 | 8/2003 | Shaver et al. | |
| 2004/0225553 A1* | 11/2004 | Broady et al. | ........ 705/10 |
| 2005/0131770 A1 | 6/2005 | Agrawal | |
| 2007/0011082 A1 | 1/2007 | Lynch | |
| 2007/0094180 A1 | 4/2007 | Rifkin et al. | |
| 2007/0100803 A1* | 5/2007 | Cava | ........ 707/3 |
| 2007/0299743 A1* | 12/2007 | Staib et al. | ........ 705/27 |
| 2008/0059280 A1 | 3/2008 | Tellefsen et al. | |

OTHER PUBLICATIONS

BBC news traditional retailers beat dot.coms, BBC News, Oct. 16, 2000, http://news.bbc.co.uk/2/hi/business/974515.stm, retrieved Jul. 12, 2012.*
Goolsbee et al, Measuring prices and price competition online: Amazon and Barnes and Noble, working paper 9085, National Bureau of Economic Research, Jul. 2002.*
Ward, M., Traditional Retailers Beat dot.coms, *BBC News/Business*, pp. 1-2, Oct. 16, 2000.
U.S. Appl. No. 12/478,813, filed Jun. 5, 2009.
U.S. Appl. No. 12/098,992, filed Apr. 7, 2008.

* cited by examiner

*Primary Examiner* — George Chen
(74) *Attorney, Agent, or Firm* — Johnson, Marcou & Isaacs, LLC

(57) ABSTRACT

An e-commerce price index is constructed and maintained based on consumer actions in connection with one or more e-commerce websites. A data collector software module collects information regarding products sold or available for sale online, including a price and rate of clicks received for each product on the website(s). An index software module analyzes the collected information to construct the price index. Specifically, the index software module scrubs the collected information to remove outliers and fill in gaps and calculates a click-weighted average price by product category and day. The index module generates the price index by aggregating and normalizing the calculated click-weighted average prices. The index software module can compute the e-commerce price index on a virtually real-time basis. Thus, the e-commerce price index can provide useful information about online pricing trends far earlier than traditional indices.

14 Claims, 5 Drawing Sheets

(a) Flat Panel Televisions

E-COMMERCE PRICE INDEX

TECHNICAL FIELD

The present disclosure relates generally to a price index and, more specifically, to a price index for products purchased online.

BACKGROUND

Price indices measure changes over time in the price level of consumer products. The United States consumer price index ("CPI"), calculated by the Bureau of Labor Statistics, is a widely used index, which tracks the price of a sample of items that consumers buy for day-to-day living. Similarly, the producer price index ("PPI") tracks the selling prices received by domestic producers for their output.

Each of these conventional indices is constructed monthly, based on market surveys. Therefore, a significant lag exists in the index data. In addition, these indices do not provide specific pricing trend information for Internet-based sales.

Therefore, it would be useful to provide a price index for products purchased online. It also would be useful for such an index to provide up to date information.

SUMMARY

In one embodiment, a computer-implemented method for providing an e-commerce price index includes reading information regarding products available for purchase online. The information includes, for each of multiple product offers, a product, a price, and a click rate. The click rate represents a number of times in a time period that one or more web-based input mechanisms, such as web links, associated with the product offer are activated. Each product is associated with a product category.

An index module calculates a click-weighted average price for each product category based on the read information. The index module constructs the e-commerce price index based on the calculated click-weighted average price for each product category. The e-commerce price index indicates changes over time as the prices of the products change. The index module is implemented in at least one computer system that includes instructions stored in a machine-readable medium and a processor that executes the instructions.

DETAILED DESCRIPTION OF EXEMPLARY EMBODIMENTS

Overview

The methods and systems described herein enable a price index. Specifically, the methods and systems provide a price index for products purchased online (an "e-commerce price index"). In certain exemplary embodiments, the e-commerce price index is constructed and maintained based on consumer actions in connection with one or more e-commerce websites. For example, a data collector software module may collect information regarding products sold or available for sale online, including a record of clicks received for each product on the e-commerce website(s).

An index software module may analyze the collected information to construct the price index. For example, the index software module may construct the index by scrubbing collected information to remove outliers and fill in gaps, and then calculating a weighted average price by product category and day. Traditional price indices, such as CPI, weight average prices based on actual purchase information. In certain instances, purchase data may not be available for online products. In these cases, website clicks or impressions can serve as a proxy for purchase information, where purchase rates can be assumed to be substantially proportional to click rates or impression weights. Thus, the index software module may determine that product expenditures will be proportional to the price multiplied by the number of clicks in each product category.

The index software module can compute the e-commerce price index on a virtually real-time basis. Thus, the e-commerce price index can provide useful information about online pricing trends far earlier than traditional indices.

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. The inventive functionality of the invention will be explained in more detail in the following description, read in conjunction with the figures illustrating the program flow.

Turning now to the drawings, in which like numerals indicate like elements throughout the figures, exemplary embodiments of the invention are described in detail.

System Architecture

Figure 1:
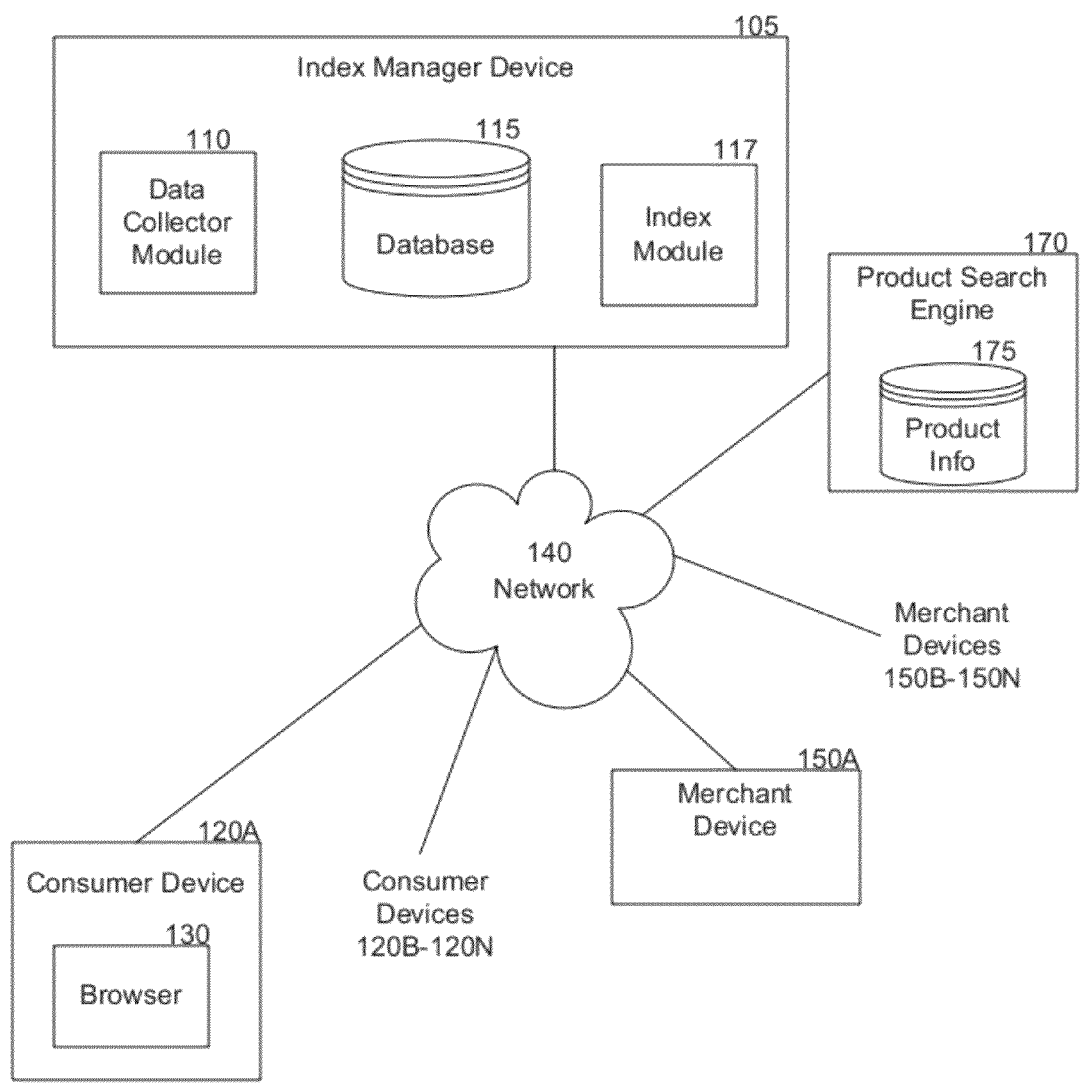
FIG. 1 is a block diagram depicting a system for providing an e-commerce price index, in accordance with certain exemplary embodiments.

FIG. 1 depicts a system 100 for providing an e-commerce price index, in accordance with certain exemplary embodiments. As depicted in FIG. 1, the system 100 includes network devices 105, 120, 150, and 170 that are configured to communicate with one another via one or more networks 140. Each network 140 includes a wired or wireless telecommunication system by which network devices (including devices 105, 120, and 150) can exchange data. For example, each network 140 can include a local area network ("LAN"), a wide area network ("WAN"), an intranet, an Internet, or any combination thereof. Throughout the discussion of exemplary embodiments, it should be understood that the terms "data" and "information" are used interchangeably herein to refer to text, images, audio, video, or any other form of information that can exist in a computer-based environment.

Each network device 105, 120, 150, and 170 includes a device capable of transmitting and receiving data over the network 140. For example, each network device 105, 120, 150, and 170 can include a server, desktop computer, laptop computer, smartphone, handheld computer, personal digital assistant (PDA), or any other wired or wireless, processor-driven device. In the exemplary embodiment depicted in FIG. 1, the network devices 105, 120, 150, 170 are operated by or on behalf of an index manager, a consumer, a merchant, and a product search engine, respectively.

Each consumer device 120 includes a browser application module 130, such as Microsoft Internet Explorer, Firefox, Netscape, Google Chrome, or another suitable application for interacting with web page files maintained by the index manager device 105, merchant devices 150, product search engine 170, and/or other network devices. The web page files can include text, graphics, images, sound, video, and other multimedia or data files that can be transmitted via the network 140. For example, the web page files can include one or more files in the HyperText Markup Language (HTML). The browser application module 130 can receive web page files from the index manager device 105, product search engine 170, and/or merchant network devices 150 and can display the web pages to a consumer operating the consumer device 120.

The web pages from the index manager device 105, product search engine 170, and/or the merchant devices 150 can include information regarding products available for purchase via the consumer devices 120. For example, the product search engine 170 can provide searchable web pages with product information 175 from several different merchants. The index manager device 105 includes a data collector module 110, which is programmed to collect information regarding products sold or available for sale online, including a record of clicks received for each product on applicable e-commerce web page(s). In certain exemplary embodiments, the index manager device 105 can collect such information from the web pages maintained by the product search engine 170, the index manager device 105, and/or the merchant devices 150, and/or via data feeds from merchants or other entities. For example, the product search engine 170 can aggregate product information—including click rates—from the web pages of the product search engine 170 and/or other network devices 105, 120, and 150, and provide this aggregate information to the index manager device 105. In certain exemplary embodiments, the data collector module 110 may store this information in a database 115 of the index manager device 105. The index manager device 105 also includes an index module 117, which analyzes the information collected by the data collector module 110 to construct a price index for the products. The index module 117 may output the index or portions thereof or reports or other materials based thereon for review by third parties, such as consumers and merchants.

The index manager device 105 and the construction and use of the price index is described in more detail hereinafter with reference to the method illustrated in FIG. 2.

System Process

Figure 2:
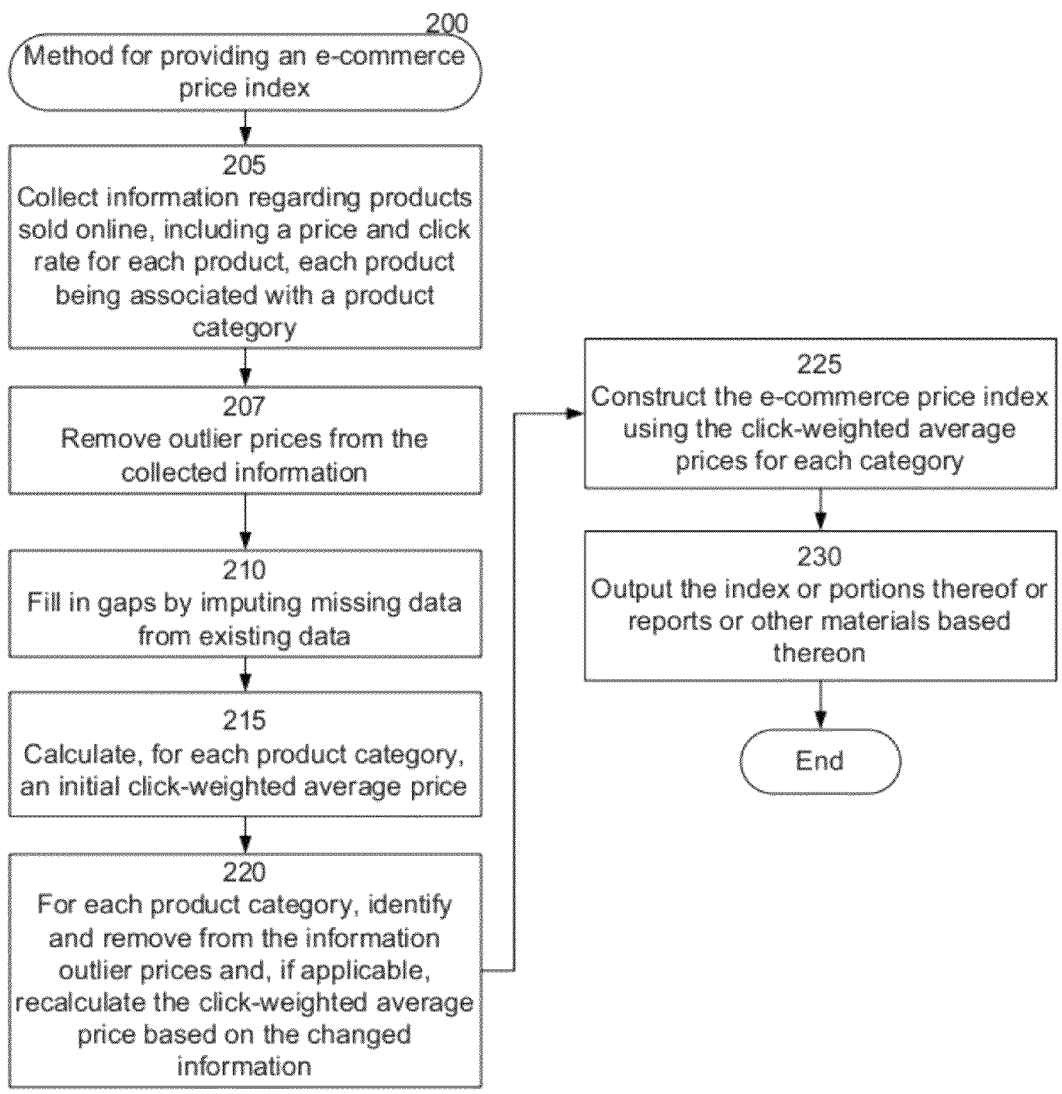
FIG. 2 is a block flow diagram depicting a method for providing an e-commerce price index, in accordance with certain exemplary embodiments.

FIG. 2 is a block flow diagram depicting a method 200 for providing an e-commerce price index, in accordance with certain exemplary embodiments. The method 200 is described with reference to the components illustrated in FIG. 1.

In block 205, the data collector module 110 collects information regarding products sold or available for sale online. This information may include, for example, one or more product identifiers, descriptions, prices, product categories, and/or click rates for each product. Product categories are groupings of similar types of products. For example, the product categories may include: (1) animals, (2) arts and entertainment, (3) baby and toddler, (4) business and industrial, (5) cameras and optics, (6) clothing and accessories, (7) electronics, (8) food, beverage, and tobacco, (9) furniture, (10) hardware, (11) health and beauty, (12) home and garden, (13) luggage, (14) media, (15) motor vehicles, (16) office supplies, (17) software, (18) sporting goods, and (19) toys and games. In certain exemplary embodiments, the collected information may include information regarding sub-categories for particular products. For example, the toys and games category may include sub-categories of (1) play equipment, (2) puzzles and games, and (3) toys. In certain exemplary embodiments, the data collector module 110 classifies the information by product category (and/or subcategory).

The click rate for a particular product can represent the number of times in a specified time period (or indefinitely) that consumers activate one or more selectable input mechanisms associated with the product. For example, a product click may be detected when a consumer browses a product catalog or completes a web-based search for information regarding a product and clicks on or otherwise activates a link associated with the product. The data collector module 110 can collect the information in block 205 directly from merchant devices 150 and/or consumer devices 120 and/or via an intermediary network device (not shown). For example, the data collector module 110 can communicate with the product search engine 170 to obtain the information in block 205. The data collector module 110 can store the collected information in a computer readable storage medium such as a database 115.

In block 207, the index module 117 revises the collected information to remove outlier price information, such as prices that are inaccurate or otherwise not reflective of general product pricing. In certain exemplary embodiments, the index module 117 can remove cross-sectional outliers, which include prices that deviate from the applicable average price by more than a pre-determined amount. For example, cross-sectional outliers may be identified by defining a price distribution by category each day. Price may be specified per product/merchant offer combination, for example. In certain exemplary embodiments, prices above or below a specified range from the median price may be identified as outliers. For example, prices above or below three times the interquartile range ("IQR") from the median price may be identified as outliers. As would be understood by a person of ordinary skill in the art having the benefit of the present disclosure, the IQR is the statistical spread between the first and third quartiles of a set of data. The outlier removal in block 207 is described in more detail below in connection with the exemplary chart provided in FIG. 3.

In block 210, the index module 117 further revises the collected information to fill in any gaps. For example, the collected information may be missing information for certain days due to one or more data logging problems. In certain exemplary embodiments, missing data for a particular day is imputed based on data for other days. For example, missing data for one day may be imputed with an average of four weeks (two weeks before and after the day) by the most granular level of category. This way, the data reflects the cyclical nature of Internet shopping activity, without short term price volatility associated with seasonality or product related issues. As would be recognized by a person of ordinary skill in the art, block 210 may not be included in certain alternative exemplary embodiments. For example, if it is desired to construct the index using only actual (and not imputed) information, block 210 may be omitted.

In block 215, the index module 117 calculates, for each product category (and/or subcategory) an initial click-weighted average price. A category's initial click-weighted average price includes a weighted average of the product prices in the category. The product prices may be actual prices or prices imputed in block 210. The product prices are weighted by their respective click rates.

In certain exemplary embodiments, a click-weighted average price for a category is calculated using the following equation:

$$\omega_{i,t} = \frac{\sum_{s=1}^{364} P_{i,t-s+1} C_{i,t-s+1}}{\sum_{i} \sum_{s=1}^{364} P_{i,t-s+1} C_{i,t-s+1}},$$

where $\omega_{i,t}$ is the click-weighted average price for the i-th category at time t, $$P_{i,t} = \frac{\sum_{j,k} p_{i,j,k,t} c_{i,j,k,t}}{\sum_{j,k} c_{i,j,k,t}}, t = 1, \ldots, T, i = 1, \ldots, N,$$

$$C_{i,t} = \sum_{j,k} c_{i,j,k,t},$$

$p_{i,j,k,t}$ is the unit price for j-th product sold at the k-th merchant from the i-th category at time t, and $c_{i,j,k,t}$ is the number of clicks for the j-th product sold at the k-th merchant from the i-th category at time t. By aggregating over time, seasonality and relative spending at the i-th category are removed. As would be recognized by a person of ordinary skill in the art, the above equations are based on a weight calculated daily. Thus, the weight is a dynamic weight, which may change as click rates change. Similarly, the index may be recalculated and adjusted as the weights and product information change.

A person of ordinary skill in the art having the benefit of the present disclosure will recognize that weights may be calculated in different timeframes in certain alternative exemplary embodiments. In addition, a person of ordinary skill in the art having the benefit of the present disclosure will recognize that, in certain alternative exemplary embodiments, the prices may be weighted based on purchase rates instead of click rates, if purchase information is available. For example, the index manager device 105 can collect purchase information from the product search engine 170, the index manager device 105, and/or the merchant devices 150, and/or via data feeds from merchants or other entities.

In block 220, the index module 117 removes additional outlier price information. The removed outliers may include time series outliers, for example. Time series outliers include prices that are significantly different from reference price values. In certain exemplary embodiments, assuming the applicable click weighted price follows a lognormal distribution, time series outliers may be identified by comparing log values of reference prices with log values of subject prices. For example, a price may be identified as an outlier if the log of the price is bigger than the log of the reference price by a predetermined amount, for example, three, in absolute value. In certain exemplary embodiments, the price also must be at least a predetermined amount, for example, twenty times, above or below the reference price (such as the average price from the first week of data) to be identified as an outlier. A person of ordinary skill in the art having the benefit of the present disclosure will recognize that many other suitable methods exist for identifying outliers in the data.

In certain exemplary embodiments, after an outlier is identified, the outlier's information may be removed from further consideration. For example, the information may be deleted, marked as inactive, or otherwise disregarded in the database 115. The outlier information may be removed immediately upon identification thereof, after reviewing all collected information for outliers, or at another time. For example, a time series outlier evaluation for a particular product category (or subcategory) may occur only after first removing all cross-sectional outliers identified in the category (or subcategory). In certain exemplary embodiments, the index module 117 may update or recalculate the applicable click-weighted average price after outliers are removed.

In block 225, the index module 117 constructs the e-commerce price index using the click-weighted average prices. If the index module 117 did not identify any outliers for a particular product category (or subcategory) in block 220, the click-weighted average price for the category (or subcategory) may include the initial click-weighted average price calculated in block 215. If the index module 117 identified any outliers for the product category (or subcategory) in block 220, the click-weighted average price for the category (or subcategory) may include an updated or recalculated initial click-weighted average price, which is calculated without the pricing information for the identified outlier(s).

In certain exemplary embodiments, the index module 117 constructs the index as follows:

$$IX_t = \sum_i IX_{i,t} = \frac{\sum_i w_{i,t} P_{i,t}/P_{i,0}}{\sum_j w_{j,t}/P_{j,0}}, \quad \text{where } IX_{i,t} = \frac{w_{i,t} P_{i,t}/P_{i,0}}{\sum_j w_{j,t}/P_{j,0}}.$$

The index may be normalized as follows:

$$I\tilde{X}_t = \sum_i I\tilde{X}_{i,t} = IX_t/IX_0 \times 100, \quad \text{where } I\tilde{X}_{i,t} = IX_{i,t}/IX_0 \times 100.$$

In block 230, the index module 117 outputs the generated index or portions thereof or reports or other materials based thereon for review by a person, such as a consumer or merchant. For example, the index module 117 can generate one or more charts, which illustrate for each category (or subcategory) the click-weighted average price for products in the category (or subcategory). Such generated information may be displayed on a monitor or other display device of a consumer device 120, merchant device 150, and/or index manager device 105, for example. Block 230 is described in further detail below, in connection with the exemplary charts depicted in FIGS. 4 and 5.

Figure 3:
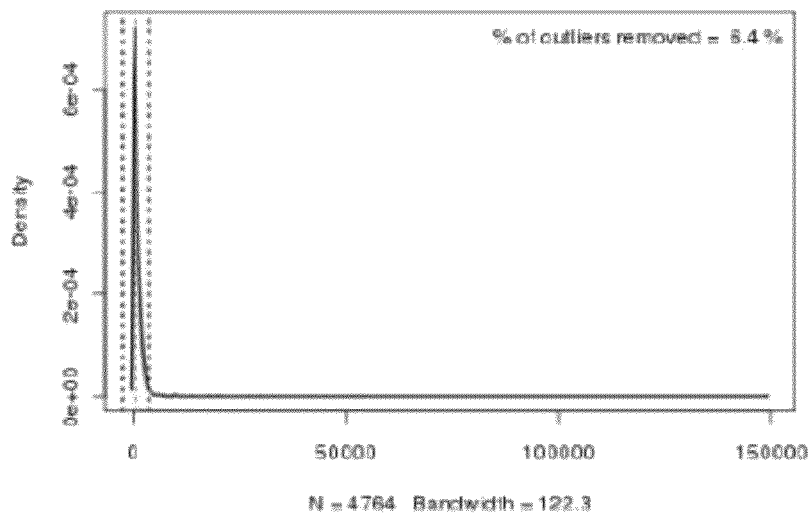
FIG. 3 is a chart illustrating outliers in a price distribution, in accordance with certain exemplary embodiments.

FIG. 3 is a chart 300 illustrating outliers in a price distribution, in accordance with certain exemplary embodiments. The chart 300 illustrates the distribution of prices per merchant/offer combination. In the exemplary embodiment depicted in FIG. 3, the chart 300 illustrates a density plot of average price by product/merchant combination under the category of flat panel televisions. The X-axis shows the average price by product/merchant, and the Y-axis shows the density at each price point. The red dotted line shows the median price, and the two blue dotted lines show exemplary thresholds (of 3 times IQR) for outlier detection.

Figure 4:
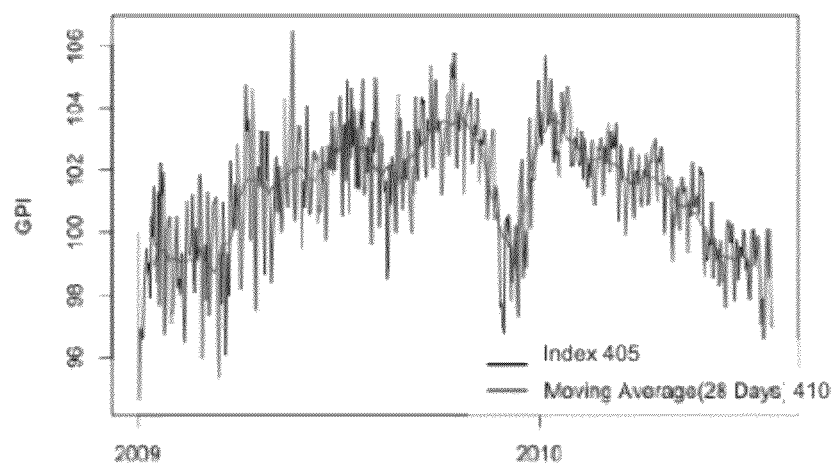
FIG. 4 is a graphical depiction of an e-commerce price index generated in accordance with the method of FIG. 2.
Figure 5:
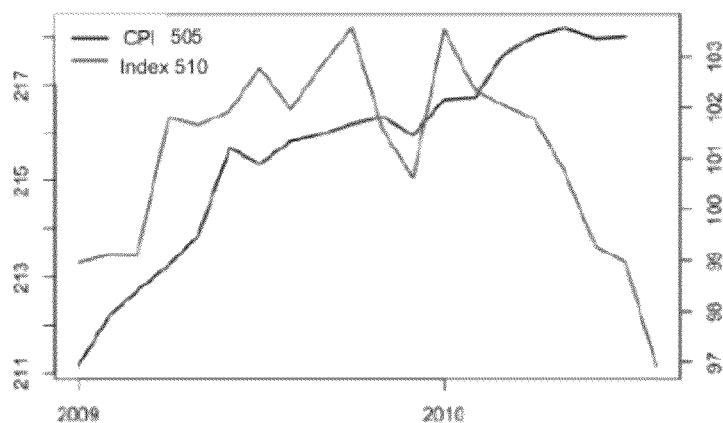
FIG. 5 is a graph that compares the e-commerce price index generated in accordance with the method of FIG. 2 with the CPI for the same time period.
Figure 6:
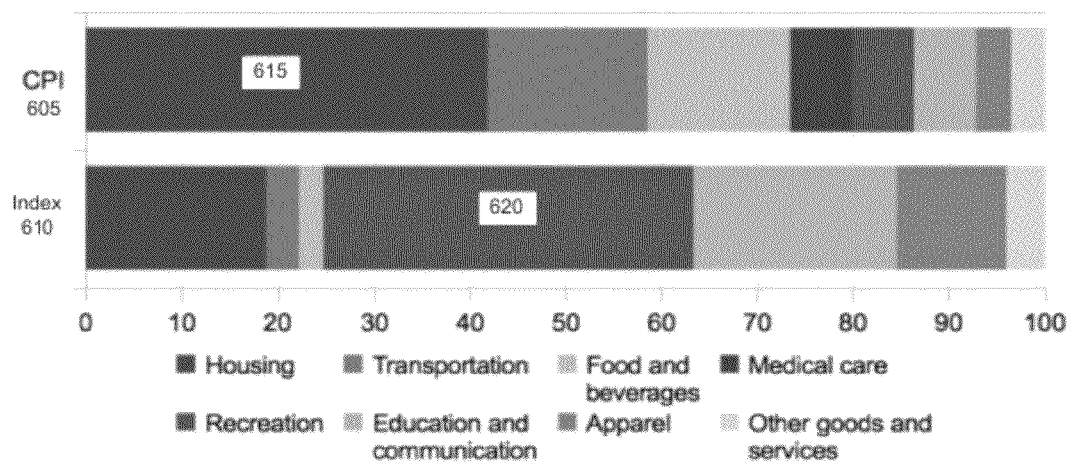
FIG. 6 depicts the relative product category weights between the e-commerce price index and CPI, in accordance with certain exemplary embodiments.

FIG. 4 is a graphical depiction 400 of an e-commerce price index generated in accordance with the method 200 of FIG. 2. The graph 400 shows both the index 405 and moving average 410. The X-axis shows time, and the Y-axis shows the e-commerce price index. FIG. 5 is a graph 500, which compares the e-commerce price index generated in accordance with the exemplary embodiments described herein 510 with the CPI 505 for the same time period. The X-axis shows time, the Y-axis on the left side shows the e-commerce price index 510, and the Y-axis on the right side shows the CPI 505. As illustrated in the figures, while the CPI 505 has been rising over time, the e-commerce price index started to diverge during the 2009 holiday season. One explanation for this difference may be that the e-commerce price index is more sensitive to holiday shopping and the economy because consumers tend to purchase more discretionary products online. This difference is illustrated in FIG. 6, which depicts the relative product category weights between the e-commerce price index 610 and CPI 605, in accordance with certain exemplary embodiments. As illustrated in FIG. 6, the most important categories in these indices are very different. For example, the most important category in CPI 605 is housing 615, and the most important category in the e-commerce price index is recreation 620.

Figure 7:
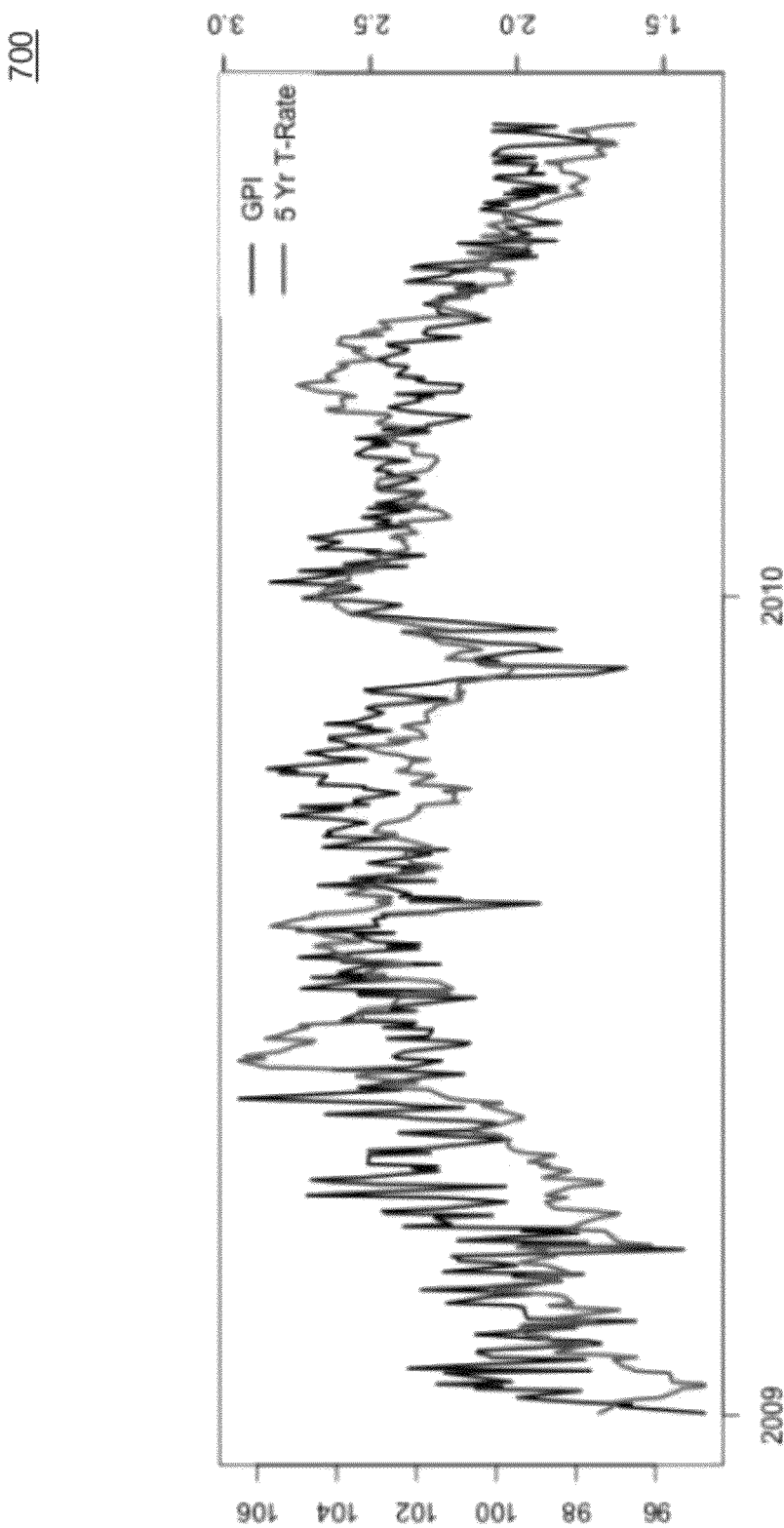
FIG. 7 is a graph that compares the e-commerce price index generated in accordance with the method of FIG. 2 with the 5-year Treasury rate for the same time period.

The sensitivity in the e-commerce index may lend itself to be a leading indicator for these indices. It also has surprisingly been discovered that the e-commerce price index may be a leading indicator for the 5-year Treasury rate, as reflected in FIG. 7. The X-axis shows time, the Y-axis on the left side shows the e-commerce price index, and the Y-axis on the right side shows the 5-year Treasury rate in percentage basis.

General

The exemplary methods and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the invention. Accordingly, such alternative embodiments are included in the inventions described herein.

The exemplary embodiments can be used with computer hardware and software that performs the methods and processing functions described above. As will be appreciated by those having ordinary skill in that art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method for providing an e-commerce price index, comprising the steps of:

reading, by a computer, information regarding products available for purchase online, the information comprising, for each of a plurality of product offers, a product, a price, and a click rate, the click rate representing a number of times in a time period that one or more web-based input mechanisms associated with the product offer are activated, each product associated with a product category;

calculating, by the computer, a click-weighted average price for each product category based on the read information, wherein each click-weighted average price is calculated using the following equation:

$$\omega_{i,t} = \frac{\sum_{s=1}^{364} P_{i,t-s+1} C_{i,t-s+1}}{\sum_{i} \sum_{s=1}^{364} P_{i,t-s+1} C_{i,t-s+1}},$$

where $\omega_{i,t}$ is the click-weighted average price for the i-th category at time t, $$P_{i,t} = \frac{\sum_{j,k} p_{i,j,k,t} c_{i,j,k,t}}{\sum_{j,k} c_{i,j,k,t}}, t = 1, \ldots, T, i = 1, \ldots, N, \quad C_{i,t} = \sum_{j,k} c_{i,j,k,t},$$

$p_{i,j,k,t}$ is the unit price for j-th product sold at the k-th merchant from the i-th category at time t, and $c_{i,j,k,t}$ is the number of clicks for the j-th product sold at the k-th merchant from the i-th category at time t; and constructing, by the computer, an e-commerce price index based on the calculated click-weighted average price for each product category, the e-commerce price index indicating changes over time in the prices of the products, wherein the index module is implemented in at least one computer system that comprises instructions stored in a machine-readable medium and a processor that executes the instructions.

2. The method of claim 1, further comprising the step of removing outlier price information prior to constructing the price index.

3. The method of claim 2, wherein the step of removing the outlier price information comprises the steps of:

for each product,
  calculating a median of the prices of the product offers for the product;
  determining whether each price for the product falls outside of a specified range around the median price; and
  classifying each of the prices determined to fall outside of the specified range as an outlier price.

4. The method of claim 2, wherein the step of removing the outlier price information further comprises the step of, for each product category for which at least one price is classified as an outlier price, recalculating the click-weighted average price for the product category, without including the outlier price in the calculation, prior to constructing the price index.

5. The method of claim 1, further comprising the step of imputing missing data in the information prior to calculating the click-weighted average price.

6. The method of claim 5, wherein the step of imputing the missing data comprises the step of imputing the missing data based on the read information.

7. The method of claim 1, further comprising the step of generating, by the computer, at least one report based on the constructed price index.

8. A computer program product, comprising:
a non-transitory computer-readable medium having computer-readable program code embodied therein that when executed by a computer cause the computer to perform a method for providing an e-commerce price index, the computer-readable program code comprising:
computer-readable program code for reading information regarding products available for purchase online, the information comprising, for each of a plurality of product offers, a product, a price, and a click rate, the click rate representing a number of times in a time period that one or more web-based input mechanisms associated with the product offer are activated, each product associated with a product category;
computer-readable program code for calculating a click-weighted average price for each product category based on the read information, wherein each click-weighted average price is calculated using the following equation:

$$\omega_{i,t} = \frac{\sum_{s=1}^{364} P_{i,t-s+1} C_{i,t-s+1}}{\sum_{i} \sum_{s=1}^{364} P_{i,t-s+1} C_{i,t-s+1}},$$

where $\omega_{i,t}$ is the click-weighted average price for the i-th category at time t, $$P_{i,t} = \frac{\sum_{j,k} p_{i,j,k,t} c_{i,j,k,t}}{\sum_{j,k} c_{i,j,k,t}}, t = 1, \ldots, T, i = 1, \ldots, N, \quad C_{i,t} = \sum_{j,k} c_{i,j,k,t},$$

$p_{i,j,k,t}$ is the unit price for j-th product sold at the k-th merchant from the i-th category at time t, and $c_{i,j,k,t}$ is the number of clicks for the j-th product sold at the k-th merchant from the i-th category at time t; and
computer-readable program code for constructing an e-commerce price index based on the calculated click-weighted average price for each product category, the e-commerce price index indicating changes over time in the prices of the products.

9. The computer program product of claim 8, wherein the computer-readable medium further comprises computer-readable program code for removing outlier price information prior to constructing the price index.

10. The computer program product of claim 9, wherein removing the outlier price information comprises:
for each product,
calculating a median of the prices for the product;
determining whether each price for the product falls outside of a specified range around the median price; and
classifying each of the prices determined to fall outside of the specified range as an outlier price.

11. The computer program product of claim 9, wherein removing the outlier price information further comprises, for each product category for which at least one price is classified as an outlier price, recalculating the click-weighted average price for the product category, without including the outlier price in the calculation, prior to constructing the price index.

12. The computer program product of claim 8, wherein the computer-readable medium further comprises computer-readable program code for imputing missing data in the information prior to the click-weighted average price being calculated.

13. The computer program product of claim 12, wherein imputing the missing data comprises of imputing the missing data based on the read information.

14. The computer program product of claim 8, wherein the computer-readable medium further comprises computer-readable program code for generating at least one report based on the constructed price index.

* * * * *